No. 876,028. PATENTED JAN. 7, 1908.
W. H. TAYLOR.
SPINDLE FOR DIAL LOCKS.
APPLICATION FILED APR. 6, 1907.
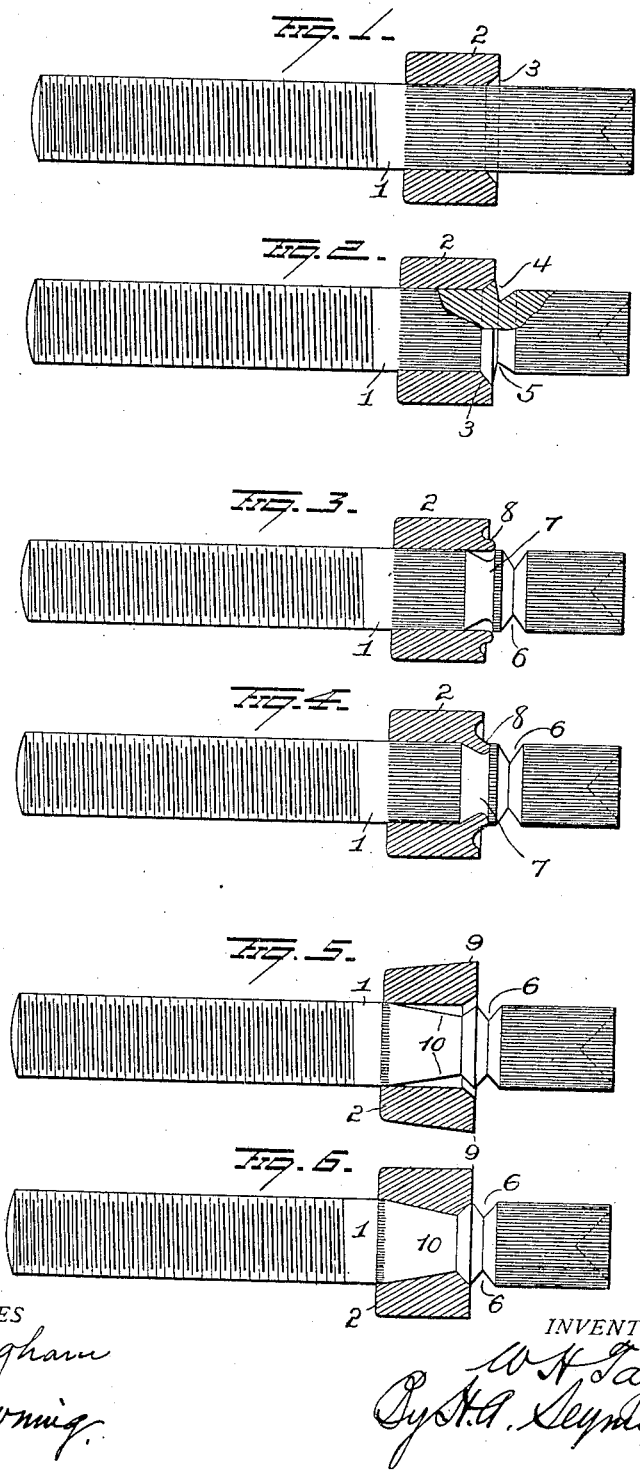

UNITED STATES PATENT OFFICE.

WARREN H. TAYLOR, OF STAMFORD, CONNECTICUT, ASSIGNOR TO THE YALE & TOWNE MANUFACTURING COMPANY, OF STAMFORD, CONNECTICUT.

SPINDLE FOR DIAL-LOCKS.

No. 876,028.

Specification of Letters Patent.

Patented Jan. 7, 1908.

Application filed April 6, 1907. Serial No. 366,807.

*To all whom it may concern:*

Be it known that I, WARREN H. TAYLOR, of Stamford, in the county of Fairfield and State of Connecticut, have invented certain new and useful Improvements in Spindles for Dial-Locks; and I do hereby declare the following to be a full, clear, and exact description of the invention, such as will enable others skilled in the art to which it appertains to make and use the same.

My invention relates to an improvement in spindles for dial locks, and it consists in a spindle having the peculiar features and characteristics hereinafter more fully described and pointed out in the claims.

In the accompanying drawings, Figure 1 is a view in elevation of a spindle before the latter has been weakened, the collar thereon being in section. Fig. 2 is a similar view showing the spindle grooved or weakened, and the metal displaced by grooving forced into a depression on the outer face of the collar. Figs. 3 and 4 and 5 and 6 are views similar to Figs. 1 and 2, of modified forms.

1 represents a spindle screw threaded at one end, and milled at its opposite end in the usual and well known manner, and 2 is a collar, which as in the spindles heretofore used, is driven or forced onto the milled end of the spindle. This collar is provided on its outer face adjacent to its bore, with a beveled depression 3 extending wholly around the bore as shown in Fig. 1. After the parts have been thus assembled, the spindle is upset at a point immediately in front of the collar, the metal 4 displaced by this operation, being forced into the depression 3. This upsetting of the spindle immediately in front of the collar, results in enlarging the diameter of that portion of the spindle within the outer end of the collar, which upset or enlarged portion of the spindle must be sheared off in order to force the spindle through the collar. This upsetting of the metal in the spindle also forms a groove 5 in that portion of the spindle immediately in advance of the collar, thus weakening the spindle at that point, so that any force applied to the outer end of the spindle, approaching that necessary to force the spindle through the collar, would break the spindle close up to the collar.

In Fig. 3 the spindle is provided with two grooves 6 and 7 from which the metal has been removed, the former being simply a weakening groove, and located just in advance of the collar, while the latter groove 7 is located within and adjacent to the outer end of the collar so as to receive the tongue or flange 8 on end of collar, the tongue or flange 8 being upset into groove 7 as shown in Fig. 4.

In the construction shown in Figs. 5 and 6, the collar is formed with its outer end 9 flaring or thicker than its inner end, the bore through same being cylindrical as shown in Fig. 5.

The spindle is provided with a weakening groove 6, and with a truncated conical section 10 immediately in rear of groove 6. The collar is passed onto the spindle until in position over the truncated conical portion 10 as shown in Fig. 5, and is then compressed or otherwise contracted at its larger end 9 so as to cause the bore thereof to closely embrace the truncated conical portion 10 as shown in Fig. 6.

In these various forms, the spindle is secured to the collar, and is weakened at a point just in front of said collar, so that any force approximating that necessary to drive the spindle inwardly through the collar, will break the spindle at its weakened point, the remaining portion of the spindle being shielded by the shoulder or collar from the action of a hammer or other driving tool.

Having fully described my invention what I claim as new and desire to secure by Letters-Patent, is:—

1. A spindle for dial locks having a collar independent of the spindle but fixed thereto so as to turn therewith, and a weakening groove in front of and adjacent to said collar.

2. A lock spindle having a collar thereon, and provided with a lip or flange overlapping the outer edge of the collar, and with a weakening groove in advance of said lip.

In testimony whereof, I have signed this specification in the presence of two subscribing witnesses.

WARREN H. TAYLOR.

Witnesses:
 SCHUYLER MERRITT,
 WILLIAM P. MOSELY.